United States Patent

[11] 3,571,591

| [72] | Inventors | John S. Bradley<br>Tulsa, Okla.;<br>William H. Luehrmann; Glenn D. Roe,<br>Dallas, Tex. |
|---|---|---|
| [21] | Appl. No. | 526,808 |
| [22] | Filed | Feb. 11, 1966 |
| [45] | Patented | Mar. 23, 1971 |
| [73] | Assignee | The Atlantic Richfield Company<br>Philadelphia, Pa. |

[54] METHOD FOR DETERMINING THE ORIGIN OF HYDROCARBON SEEPS IN WATER-COVERED AREAS AS AN AIR TO PETROLEUM EXPLORATION ACTIVITIES
6 Claims, 2 Drawing Figs.

[52] U.S. Cl. ............................................. 250/83, 250/43.5
[51] Int. Cl. ............................................. G01n 23/00, G01n 1/00
[50] Field of Search ............................................. 250/42.5 (R), 83 (SA)

[56] References Cited
UNITED STATES PATENTS

| 2,918,579 | 12/1959 | Slobod et al. | 250/83SA |
| 3,056,886 | 10/1962 | Glaude et al. | 250/43.5RX |
| 3,033,287 | 5/1962 | Bond | 250/83SA |

*Primary Examiner*—Archie R. Borchelt
*Attorneys*—Norbert E. Birch and Blucher S. Tharp ABSTRACT: A method for determining the origin of hydrocarbon seeps in water-covered areas in order to establish whether the seeps are derived from depth and thereby indicative of subsurface deposits of petroleum or whether they merely represent marsh gas. The seep gases are sampled directly and also by degassing water samples taken from sediments in the immediate vicinity of the seeps. Alpha-activity measurements are made on the seep gases and their origin is determined by comparison with alpha-activity ratios obtained using known standards.

PATENTED MAR 23 1971 3,571,591

INVENTORS
John S. Bradley
William H. Luehrmann
Glenn D. Roe
BY
Blucher S Tharp
Attorney

METHOD FOR DETERMINING THE ORIGIN OF HYDROCARBON SEEPS IN WATER-COVERED AREAS AS AN AID TO PETROLEUM EXPLORATION ACTIVITIES

The present invention relates to methods for validating seeps in water-covered areas as indicative of subsurface deposits of hydrocarbons. More particularly, the invention concerns distinguishing gas from depth from marsh gas by radiological methods.

The objects of Applicants' invention include the following:

To provide a method whereby it is possible to distinguish gas from depth from marsh gas on the basis of the concentration of some component in the gas relative to the water in the bottom sediment.

To provide a method for validating seeps in water-covered areas as indicative of gas from depth based on the radon concentration of gas from the suspected seep.

To provide a method for validating seeps in water-covered areas which is accurate, reliable, adaptable for field use, simple to perform, and economically feasible.

In describing Applicants' invention recourse is made to FIGS. 1 and 2 wherein.

It is well known that it is possible to detect subsurface accumulations of oil and gas by locating concentrations of hydrocarbon gases, i.e. seeps, which reach the surface. Owing to leakage as a separate gas phase along faults and cracks, or by agency of circulating ground water, hydrocarbon gases are able to escape from reservoir rocks to surface layers and disperse into the atmosphere.

Seeps can frequently be observed in bodies of water by visual inspection. Hydrocarbon gases from seeps can also be detected by various geochemical and geophysical methods including using infrared or flame ionization detectors, measuring temperature variations or other anomalies in the water, etc. Since methane is the primary constituent of seep gas, such detection methods are often specific for methane.

However, none of these methods can readily distinguish between seep gas and marsh gas. Marsh gas is methane which is formed in mines, swamps, and like places where vegetable matter is decaying under water (anaerobic fermentation). Therefore, even high concentrations of methane are not necessarily indicative of subsurface crude oil or gas accumulations.

There is a great need for some method or process whereby gas from depth, i.e. seep gas, can be distinguished from marsh gas or surface gas. Much time and expense could be saved if there was some method for validating gas shows as gas from depth as opposed to mere marsh gas.

Accordingly, the present invention proposes methods for validating seeps on water-covered areas whereby gas from depth may be distinguished from marsh gas.

By "water-covered area" is meant all types of bodies of water, whether saline or fresh, which are at least in part exposed to the atmosphere. For instance, the body of water may be an ocean, a sea, a lake, an inlet, a gulf, a sound, a lagoon, a harbor, a stream, a river, a marsh, a swamp, etc.

Figure 1:
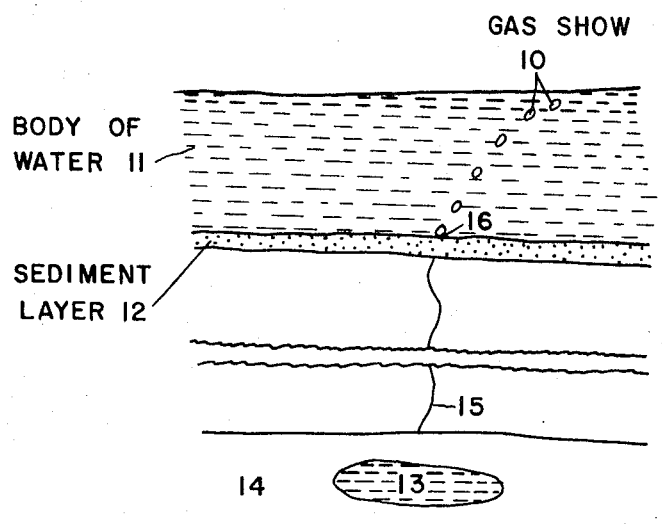
FIG. 1 is a schematic drawing of a vertical section of the earth illustrating the invention.

Reference is now made to FIG. 1.

Assume that gas show 10 in body of water 11 is a hydrocarbon gas of unknown origin. Gas evolved from show 10 may have its origin at depth or be formed by decomposition of organic matter in sediment layer 12. A possible source for gas derived from depth is represented by petroleum deposit 13 in subsurface formation 14. Fissure 15 represents a path which gas from petroleum deposit 13 may follow in reaching the surface. The apparent origin of show 10 is indicated by point 16 on the surface of layer 12.

Sediment layer 12 may contain material such as gravel, shingle, sand, silt, ash, clay, mud, etc. The mud (or ooze) may contain accumulations of carapaces, shells, skeletons, and decaying vegetable matter. Also, layer 12, being permeable, is generally saturated with water from body of water 11.

Wherever its actual origin, a portion of the gas from show 10 will dissolve in body of water 11 and the remainder will stay in the vapor or gaseous phase, rise to the surface, and disperse into the atmosphere. It follows that gas from show 10 or, to be more accurate, each component thereof, should tend toward an equilibrium relation between its gaseous phase and the surrounding aqueous phase.

As a practical matter equilibrium between gas originating in layer 12 and the surrounding water can only be established in sediment layer 12, i.e. below the interface between body of water 11 and the sediments. Thus, only within the confines of layer 12 can one assume that the surrounding water is saturated with the gas comprising the show.

Applicants have discovered that marsh gas generated in sediments 12 will show certain equilibrium relations with the surrounding water, i.e. the interstitial water in the sediments, and that gas generated at depth usually will not establish equilibrium relations. It follows that one should be able to ascertain the source of a gas of unknown origin by measuring the relative concentration of a preselected component thereof between the gas phase and the sediment water and correlating this information with the relative concentrations established for gas shows where the evolved gas is known to be gas from depth, on the one hand, and marsh gas, on the other.

One way whereby gas from depth can be distinguished from marsh gas involves the use of a radioactive substance as the preselected component. The concentration of the preselected component in different phases can then readily be measured by conventional radiological techniques.

It is not necessary that this radioactive component be a hydrocarbon gas as long as it is generally associated with both gas from depth and marsh gas. It is necessary, however, that the preselected component has at least limited solubility in water. Applicants have found that the ideal choice for such a component is radon.

Radon possesses a particularly stable electronic configuration which gives it the chemical inertness characteristic of noble-gas elements. Therefore, the only chemical form known is the free element. Radon is appreciably soluble in water and in organic liquids. Radon is found in natural sources because of its continuous replenishment by the radioactive decay of longer-lived precursors, such as uranium. Radon has wide distribution and may be detected in the soil, surface and subsurface waters, hydrocarbon deposits, seep gas, marsh gas, the atmosphere near the ground, etc.

All isotopes of radon are radioactive with short half-lives. Radon-222, the most stable isotope of radon, decays by the emission of energetic alpha particles at such a rate that one-half of any given quantity of radon disintegrates in 3.82 days. Any surface exposed to radon-222 becomes coated with an active deposit which consists of a group of short-lived daughter products, including radium. The radiations of this deposit include energetic alpha, beta, and gamma rays. Hence, though radon is generally determined from alpha-activity measurements, beta or gamma determinations may be used as quantitative measures where desired.

According to the preferred embodiment of Applicants' invention, one first determines the radon concentration of gas evolved from a preselected gas show and, in conjunction therewith, determines the radon concentration of water in the immediate vicinity to the apparent origin of the show in the sediments. By comparing the ratio of the radon concentrations thus obtained with standard radon ratios similarly obtained representing evolved gas known to be gas from depth and marsh gas, respectively, it is possible to predict the origin of the show, i.e. distinguish between gas from depth and marsh gas.

The sampling procedure generally employed has been to collect a first sample of gas from each show of interest and a sample of water from the sediment layer in the immediate vicinity thereto. The sample of water is then degassed to provide a second sample of gas which represents the aqueous phase. Portions of these gas samples are then analyzed for alpha-activity by conventional radiological means.

It has been found that the alpha-activity ratio of the first sample of gas to the second sample of gas, i.e. the gas in the gaseous phase to the gas in the aqueous phase, can be used to predict the origin of the gas in the show. Specifically, the show may be characterized as indicative of gas from depth where the alpha-activity ratio is without a prestated critical range. For instance, if one adheres to the test procedures in the Example, the critical range is about 4.0—6.0, i.e. a ratio falling without this range is indicative of gas from depth. (A ratio falling within this range is best considered as inconclusive.) Again following the test procedures in the Example, a more stringent test is to require that the alpha-activity ratio be without the range of about 2.5 to 7.5 before characterizing the show as indicative of gas from depth.

It should be appreciated that the gas samples should be collected underwater to prevent dilution with air. This may be done, for example, by displacing water from a bottle or the like with gas from the show. The water samples should be taken from among the sediments associated with the show as close as possible to the apparent origin thereof. This may be accomplished by withdrawing the water from the sediments with a hollow probe or tube. Where the water is deep, the desired samples may be collected by divers or by means of special sampling equipment.

While it is possible to determine the alpha-activity of the water sample directly, best results are obtained where the water samples are degassed and the gas which is recovered from the water is analyzed for alpha-activity. The assumption may be made, assuming suitable recovery procedures, that the alpha-activity of the sample of water and the gas obtained from the water will be essentially the same.

Applicants again emphasize that it is only within the sediment layer that the necessary static conditions exist for a meaningful equilibrium to be established.

Figure 2:
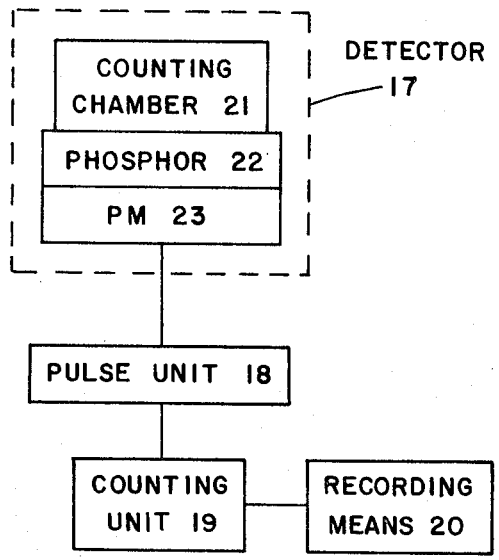
FIG. 2 is a block diagram of an alpha-radiation analyzer which can be used to analyze gas samples for alpha-activity.

The radiological test means preferred is shown in FIG. 2.

The alpha-analyzer is comprised of detector unit 17, pulse unit 18, counting unit 19, and recording means 20. Detector 17 in turn is composed of counting chamber 21, phosphor 22, and photomultiplier 23.

Counting chamber 21 holds the gas sample being analyzed. Phosphor 22 is sensitive to alpha-activity and produces light flashes in response thereto. Photomultiplier 23 receives the light flashes and produces an electrical signal which is passed to pulse unit 18. Counting unit 19 registers the pulses produced by pulse unit 18 over a preselected period of time. The output from counting unit 19 passes to recording means 20 where a time plot is made.

The operation of the alpha-analyzer and the practice of the invention is further described below.

EXAMPLE

Equipment Description

The counting chamber consists of 5½ inches diameter cylindrical cavity with a height of one-eighth inch. The cavity is formed by placing an aluminum cover over a lucite light pipe which has an alpha sensitive phosphorescent coating. The untreated side of the light pipe is sealed to the face of a 5-inch photomultiplier tube.

Alpha particles which strike the phosphor will cause photon emission. Photons transmitted through the light pipe into the photomultiplier tube will cause a progressive cascading of electrons which results in a sharp signal pulse on the photomultiplier output.

Pulses from the photomultiplier tube are shaped, amplified, and fed to a trigger circuit. The trigger pulse operates a delay multivibrator which puts out two square waves, one positive and one negative. The positive pulse is used to drive a counter which registers a running total of all pulses. The negative pulse provides charge for a count rate meter used to obtain 10—15 minutes integrating time.

Collection of Samples

In order to compare radon contents it is necessary to collect a sample of gas from the show under consideration and a sample of water from the same locality.

The gas is collected by inverting a bottle with a funnel attachment in the water above the gas show. Gas bubbling into the bottle displaces water. (If gas bubbles are not rising freely in the sample area, disturbing the sediment will release gas to be collected.) A water seal is kept on the bottle by retaining water in the neck when capping the bottle. The bottle is transported in an inverted position to the counting chamber.

Water samples must be taken from the water in the sediment and not from surface water which is free to exchange gas with the atmosphere. A hollow metal probe is inserted into the sediment in a closed position, i.e. a rubber hose on the upper end of the probe is clamped shut. Water is drawn through the tube with a syringe and transferred to a sample bottle. Careful handling of the sample is necessary to prevent aeration of the water. (For this reason, the first syringe collection should be discarded.) The sample bottle is filled to the top to displace air and sealed.

Preparation of Samples

The gas samples require no treatment prior to introduction into the counting chamber; however, the water samples are generally not used directly. Gas extracted from the water is measured for alpha-activity.

The water is degassed by the following procedure:
1. Draw 50 cc. water into a 100 cc. syringe.
2. Seal the tip of the syringe with a clamped rubber hose.
3. Reduce the pressure in the syringe by drawing the syringe piston out to the 85 cc. mark.
4. Shake the syringe vigorously allowing gas bubbles to escape from the water into the volume between the water and the syringe piston.
5. Release the clamp slightly allowing air to bubble up through the water until the 35 cc. gas above the water has reached atmospheric pressure.
6. Remove the rubber hose and eject the water leaving the 35 cc. gas which is representative of the radon content of the water.

Sample Counting

Prior to the measurement of the alpha-activity of a sample the equipment should be operating for 2 to 6 hours. This preoperation allows the equipment time to attain operational stability. An average of the natural background activity is obtained during this initial operation.

The length of time allowed for sample measurement depends on the intended use of the data; however, a minimum counting time of 24 hours and a maximum of 36 hours is recommended. Sufficient data is obtained in the time to compensate for statistical fluctuations in the rate of alpha-emission and temperature controlled calibration changes.

Reproducibility of results depends on introduction of a constant amount of gas into the counting chamber. Thirty cc. of gas may be injected into the chamber provided the chamber pressure is reduced to 0.3 atmosphere prior to gas admission.

The procedure for introducing gas into the chamber is detailed below.
1. Flush the counting chamber with nitrogen or air.
2. Seal one of the chamber outlet tubes with a clamp and withdraw nitrogen or air through the other tube leaving the chamber at a pressure of 0.3 atmosphere.
3. Introduce sample gas through one of the outlet tubes returning the chamber to atmospheric pressure.
4. With both tubes sealed, start the counting procedure.

A gas sample is removed from the counting chamber by flushing with air. A vacuum pump connected to one of the hoses is a very effective way to draw air.

A 5-hour delay should be used between samples to assure return to normal background conditions.

Data Processing

At the conclusion of a sample measurement, the equipment is turned off and the record is removed from the recorder. Minor statistical fluctuations in the counting rate are removed by taking 2-hour averages of the data. A predetermined background value is subtracted from each of the 2-hour averages and the resulting values are plotted on semilog paper. Allowance must be made for the time interval elapsed between sample collection and initiation of counting.

The line which best fits the data and which has a 91.2-hour half-life slope is drawn through the plotted points and extended back to zero. The ratio of two samples may be determined by comparing the decay curves (after adjustment for comparative counting efficiency).

We claim:

1. A method for determining the origin of a hydrocarbon seep in water-covered areas comprising:
   a. sampling the gaseous phase of the seep to obtain a first sample of gas;
   b. sampling the aqueous phase associated with the sediments in the immediate vicinity of the seep;
   c. degassing the water collected in step (b) to obtain a second sample of gas;
   d. analyzing said first and second samples of gas in order to determine the relative concentration of a preselected component thereof; and
   e. correlating the relative concentration thus obtained with relative concentrations similarly established for hydrocarbon seeps associated with
      1. known subsurface deposits of petroleum and
      2. known sources of marsh gas.

2. A method according to claim 1 where said preselected component is radon.

3. A method according to claim 1 where said first sample of gas is collected underwater by displacing water from an inverted container.

4. A method for determining the origin of a hydrocarbon seep in water-covered areas comprising:
   a. collecting a first sample of gas from the seep;
   b. collecting a sample of water from the sediment layer near the apparent origin of the seep;
   c. degassing said sample of water to provide a second sample of gas;
   d. measuring fixed portions of first and second samples of gas so as to determine the relative value of a predetermined characteristic parameter; and
   e. correlating the determined relative value of said parameter with a standard scale of values representing
      1. known sources of gas from depth and
      2. marsh gas.

5. A method according to claim 4 where said predetermined parameter is alpha-activity.

6. A method according to claim 4 where said first sample of gas is collected underwater by displacing water from an inverted container.